US008660196B2

(12) United States Patent
Schwager et al.

(10) Patent No.: US 8,660,196 B2
(45) Date of Patent: Feb. 25, 2014

(54) COMMUNICATIONS SYSTEM USING BEAMFORMING

(71) Applicant: Sony Corporation, Tokyo (JP)

(72) Inventors: Andreas Schwager, Waiblingen (DE); Lothar Stadelmeier, Stuttgart (DE); Daniel Schneider, Stuttgart (DE)

(73) Assignee: SONY Corporation, Tokyo (JP)

( * ) Notice: Subject to any disclaimer, the term of this patent is extended or adjusted under 35 U.S.C. 154(b) by 0 days.

(21) Appl. No.: 13/657,195

(22) Filed: Oct. 22, 2012

(65) Prior Publication Data

US 2013/0107974 A1 May 2, 2013

Related U.S. Application Data

(63) Continuation of application No. 13/517,477, filed as application No. PCT/EP2010/007966 on Dec. 29, 2010.

(30) Foreign Application Priority Data

Dec. 30, 2009 (EP) .................................. 09016144

(51) Int. Cl.
*H04L 27/00* (2006.01)
(52) U.S. Cl.
USPC ........... 375/259; 375/257; 375/260; 375/295; 375/299; 375/316
(58) Field of Classification Search
USPC ......... 375/257, 259, 260, 262, 265, 267, 270, 375/271, 295, 299, 302, 316, 322, 330, 340, 375/342, 346
See application file for complete search history.

(56) References Cited

U.S. PATENT DOCUMENTS

| 7,269,403 B1* | 9/2007 | Miao ............................ 455/402 |
| 8,442,457 B2* | 5/2013 | Harel et al. .................... 455/101 |
| 8,447,237 B2* | 5/2013 | Reial et al. .................... 455/63.1 |
| 8,498,362 B2* | 7/2013 | Zhang et al. .................. 375/285 |

(Continued)

FOREIGN PATENT DOCUMENTS

| EP | 2 019 496 | 1/2009 | |
| EP | 2019496 A1 * | 1/2009 | ............... H04L 1/06 |
| EP | 2 061 160 | 5/2009 | |

OTHER PUBLICATIONS

Extended European Search Report issued Jan. 18, 2013 in Patent Application No. 12007535.3.

(Continued)

*Primary Examiner* — Hirdepal Singh
(74) *Attorney, Agent, or Firm* — Oblon, Spivak, McClelland, Maier & Neustadt, L.L.P.

(57) ABSTRACT

In a MIMO communications system a first communications device applies beamforming to a complete transmission packet including both synchronization data and either payload data or training symbols. A second communications device evaluates the beamformed synchronization data and determines and transmits a feedback information indicating minimum required synchronization data and/or a minimum number of training symbols. The first communications device tailors the synchronization data and/or number of training symbols on the basis of the feedback information. Beamforming the complete transmission packet facilitates signal suppression at defined locations. When the channel properties change, the second communications device may provide further channel state information to adapt beamforming in the first communications device without transmission of not beamformed training symbols. The communications system may be a powerline telecommunications system.

14 Claims, 13 Drawing Sheets

(56) References Cited

U.S. PATENT DOCUMENTS

| | | | |
|---|---|---|---|
| 2008/0026763 A1* | 1/2008 | van Rensburg et al. | 455/446 |
| 2008/0260010 A1* | 10/2008 | Schwager et al. | 375/222 |
| 2009/0061779 A1* | 3/2009 | Gurney et al. | 455/63.1 |
| 2009/0232239 A1* | 9/2009 | Ko et al. | 375/260 |
| 2010/0283391 A1* | 11/2010 | Braunshtein | 315/127 |
| 2010/0304680 A1* | 12/2010 | Kuffner et al. | 455/63.1 |
| 2013/0022144 A1* | 1/2013 | Kotecha et al. | 375/267 |

OTHER PUBLICATIONS

Cheran M. Vithanage, et al., "Precoding in OFDM-Based Multi-Antenna Ultra-Wideband Systems", IEEE Communications Magazine, vol. 47, No. 1, XP011280612A, Jan. 1, 2009, pp. 41-47.

Mai Vu, et al., "MIMO Wireless Linear Precoding" IEEE Signal Processing Magazine, vol. 24, No. 5, XP011194357A, Sep. 1, 2007, pp. 86-105.

P. Amirshahi, et al., "Fountain Codes for Impulsive Noise Correction in Low-Voltage Indoor Power-line Broadband Communications", Consumer Communications and Networking Conference, vol. 1, XP010893253A, Jan. 8, 2006, pp. 473-477.

U.S. Appl. No. 13/601,561, filed Aug. 31, 2012, Stadelmeier, et al.

U.S. Appl. No. 13/601,697, filed Aug. 31, 2012, Schwager, et al.

Office Action issued Jun. 24, 2013 in European Patent Application No. 10 798 276.1.

Schneider, D., et al., "Precoded Spatial Multiplexing MIMO for Inhome Power Line Communications." Global Telecomunications Conference, IEEE Global, pp. 1-5, (Nov. 30, 2008).

International Search Report Issued Mar. 25, 2011 in PCT/EP10/07966 Filed Dec. 29, 2010.

International Preliminary Report on Patentability and Written Opinion issued Jul. 12, 2012 in PCT/EP2010/007966 filed Dec. 29, 2010.

* cited by examiner

US 8,660,196 B2

COMMUNICATIONS SYSTEM USING BEAMFORMING

CROSS-REFERENCE TO RELATED APPLICATIONS

This application is a continuation of U.S. application Ser. No. 13/517,477, filed Jun. 20, 2012, which is a National Stage Application of PCT/EP2010/007966, filed Dec. 29, 2010, and is incorporated herein by reference. Application Ser. No. 13/517,477 is based upon and claims the benefit of priority from prior European Patent Application No. 09 016 144.9, filed Dec. 30, 2009.

An embodiment of the present invention relates to a communications system using beamforming, wherein channel state information is fed back from a receiver device to a transmitter device of the communications system. Further embodiments relate to devices for a communications system using beamforming based on channel state information feedback and to a method for operating a communications system using channel state information at the transmitter side.

BACKGROUND

Multiple-input multiple-output (MIMO) and multiple-input single-output communications systems (MISO) use beamforming for increasing bandwidth.

WO 2004/038952 A2 describes channel estimation and spatial processing for a wireless time-division duplexed (TDD) MIMO communications system. Exploiting reciprocal channel characteristics simplifies the channel state estimation and spatial processing both at the transmitter and at the receiver side.

US 2007/0177681 A1 relates to a wireless MIMO orthogonal frequency division multiplexing (OFDM) communications system using eigenbeam forming in a downlink transmitter. An uplink feedback device provides short-term and long-term eigenbeam forming vectors to the downlink transmitter. In the downlink transmitter, an eigenmode generator generates an eigenbeam forming vector for each of a plurality of reproduced signals output from a signal reproducer at each subcarrier on the basis of the eigenbeam forming vectors. The use of short-term and long-term eigenbeam forming vectors reduces the amount of feedback information.

EP 2019496 A1 refers to a powerline communications system combining Eigenbeamforming with an adaptive orthogonal frequency division multiplex method, wherein channel state information is fed back from a receiver unit to a transmitter unit.

EP 2061160 A1 describes another powerline communications system precoding both training symbols and payload data without exchange of channel state information between the communications devices.

It is an object of the invention to provide a method and devices for enhancing data throughput in powerline communications systems and to improve interference and coexistence properties in wired communications systems.

The object is achieved by a communications systems according to claim 1, by communications devices adapted for the communications systems as they are claimed in claims 8 and 10 and by a method for operating a communications system as claimed in claim 11. Further embodiments are defined in the dependent claims respectively. Details of the invention will become more apparent from the following description of embodiments in connection with the accompanying drawings, wherein features of the various embodiments may be combined unless they exclude each other.

DETAILED DESCRIPTION

Figure 1A:
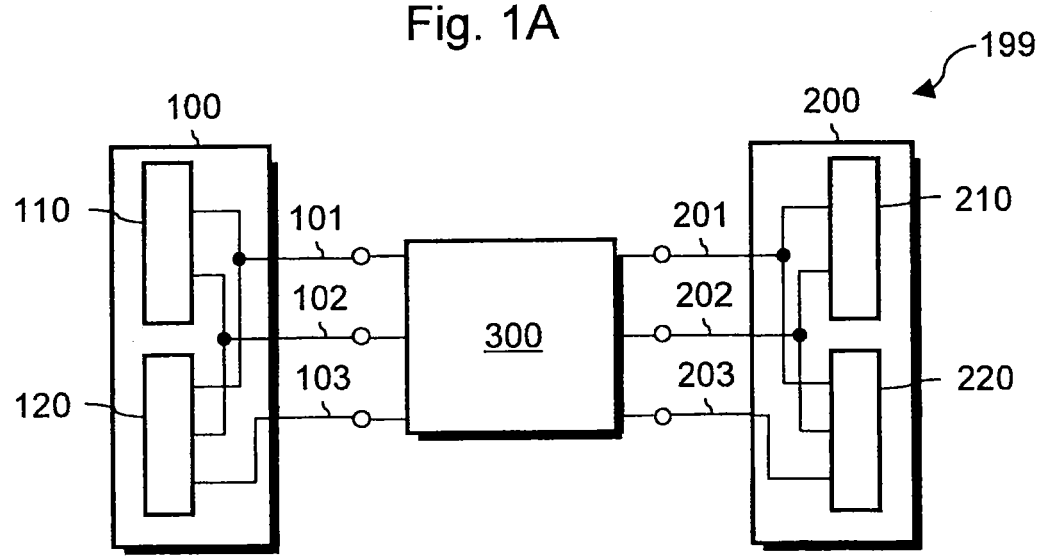
FIG. 1A is a schematic block diagram illustrating a wired MIMO communications system with a receiver unit integrated in a first communications device and a transmitter unit integrated in a second communications device in accordance with an embodiment of the invention.

FIG. 1A shows a communications system 199. The communications system 199 may be a wireless or a wired communications system, for example xDSL (generic Digital Subscriber Line) or DVB-C2 (Digital Video Broadcasting-Cable). According to an embodiment, the communications system 199 is based on an OFDM (Orthogonal Frequency Division Multiplexing) modulation scheme. In accordance with another embodiment, the communications system 199 is a system using power distribution wires for data communication. For example, the communications system 199 is a power line communications (PLC), mains communications, power line telecommunications (PLT), broadband power line (BPL) or power band or power line networking (PLN) using a modulated carrier superimposed to the 50 or 60 Hz alternating current of the power lines respectively.

The communications system 199 is a MIMO system with a first communications device 100, which includes a transmitter unit 110 employing one, two or more transmit ports 101-102, and a second communications device 200, which includes a receiver unit 220 employing at least one, for example two, three or four, receive ports 201-203. A transmission channel 300 connects the transmitter unit 110 and the receiver unit 220.

The first communications device 100 may be an exclusively transmitting device with transmit ports 101-102 only. According to other embodiments, the first communication device 100 is a bidirectional device including, in addition to the transmitter unit 110, a receiver unit 120 which may be of the type of the receiver unit 220 in the second communications device 200, wherein the ports 101-102 may be bidirectional ports and the first communications device 100 may comprise a further receive port 103. The second communications device 200 may be an exclusively receiving device. According to other embodiments, the second communications device 200 is a bidirectional device including, in addition to the receiver unit 220, a transmitter unit 210 which may be of the type of the transmitter unit 110 in the first communications device 100, wherein the ports 201-202 may be bidirectional ports. The communications devices 100, 200 may be stand-alone devices or may be integrated in an electronic device for consumer applications, for example a storage unit, a television set, an audio receiver, or a video recorder.

The transmission channel 300 may be multi-wire connection. In accordance with an embodiment the transmission channel is a power cable containing two or more electrical conductors used for transmission of AC (alternating current) electric power and installed as permanent wiring within buildings or buried in the ground. A plurality of m transmit signals $t_x$ define a transmit vector $t_m$ and a plurality of n receive signals $r_y$ define a receive vector $r_n$. For example, the transmitter unit 110 may supply two differential transmit signals $t_x$ using the live or phase wire (L, P), the neutral wire (N), and protective earth (PE), wherein the differential transmit signals $t_x$ are modulated on a carrier superposing the AC frequency of the mains voltage. According to an embodiment, the receiver unit 220 receives three differential receive signals between live wire and neutral wire, between neutral wire and protective earth, and between live wire and protective earth. According to another embodiment, the receiver unit 220 may receive the three differential receive signals and a common mode signal resulting from a leakage current from the wiring as a fourth receive signal.

In a real transmission channel 300 the transmit signals $t_x$ interfere with each other, for example through capacitive coupling between the wires. In a channel matrix $H_{n,m}$, which describes the receive vector $r_n$ as a function of the transmit vector $t_m$, the entries of each line describe one of the receive signals $r_y$ in dependence of all transmit signals $t_x$, wherein typically none of the entries $h_{i,j}$ of $H_{n,m}$ is equal 0 when crosstalk occurs.

$$r_n = H_{n,m} t_m \quad (1)$$

For enhancing the signal-to-noise ratio (SNR) the principle of beamforming provides a decoupling of the receive signals by precoding the transmit vector with a precode matrix $P_{m,m}$ such that from the resulting equivalent channel matrix $H_{n,m} P_{m,m}$ and a decoding scheme at the receiver side, a diagonal matrix can be obtained, where each receive signal depends on only one single transmit signal.

For example, the second communications device 200 may comprise a channel estimator unit for determining the channel matrix $H_{n,m}$ describing the channel state information (CSI) of the transmission channel 300 by comparing a received training symbol sequence with a nominal training symbol sequence. Then singular value decomposition of $H_{n,m}$ may be used to obtain the precode Matrix $P_{m,m}$.

As shown in equation (2), singular value decomposition (SVD) decomposes the channel matrix $H_{n,m}$ in a first unitary matrix $U_{n,n}$, the Hermitian transpose $V_{m,m}^H$ of a second unitary matrix $V_{m,m}$ and a diagonal matrix $D_{n,m}$, wherein the diagonal entries of $D_{n,m}$ are the singular values of the channel matrix $H_{n,m}$.

$$H_{n,m} = U_{n,n} D_{n,m} V_{m,m}^H \quad (2)$$

The second communications device 200 transmits feedback information containing information describing the channel matrix $H_{n,m}$ or the second unitary matrix $V_{m,m}$ to the first communications device 100. The feedback information may be transmitted via the transmission channel 300 or via an alternative transmission path. The first communications device 100 may comprise a control unit configured to generate the precode matrix on the basis of the feedback information. For example, the control unit uses the second unitary matrix $V_{m,m}$ as precode matrix. Then equation (3) describes the receive vector $r_n$, which the receiver unit 220 receives:

$$r_n = H_{n,m} V_{m,m} t_m \quad (3)$$

In equation (3) the channel matrix $H_{n,m}$ may be replaced by its SVD description in equation (2):

$$r_n = U_{n,n} D_{n,m} V_{m,m}^H V_{m,m} t_m \quad (4)$$

The product of a unitary matrix and its Hermitian transpose is the identity matrix. Decoding the receive vector using the Hermitian transpose $U_{n,n}^H$ of the first unitary matrix $U_{n,n}$ results in a decoded receive vector $y_n$ $$y_n = U_{n,n}^H U_{n,n} D_{n,m} V_{m,m}^H V_{m,m} t_m \quad (5)$$

$$y_n = D_{n,m} t_m \quad (6)$$

With regard to the decoded receive vector $y_n$, the transmission channel 300 is decomposed into a set of parallel and independent paths.

Typically, the described precoding/decoding scheme uses beamforming for decomposition of interfering signals in order to increase signal-to-noise ratio of payload data. Embodiments of the invention use beamforming for obtaining further effects, for example enhancing transmission bandwidth additionally or alternatively to the described beamforming effect on the SNR of payload data and/or for signal elimination at defined locations. Embodiments of the invention apply the beamforming precoding/decoding scheme not only for the transmission of payload data but also for the transmission of synchronization data and training symbols.

Figure 1B:
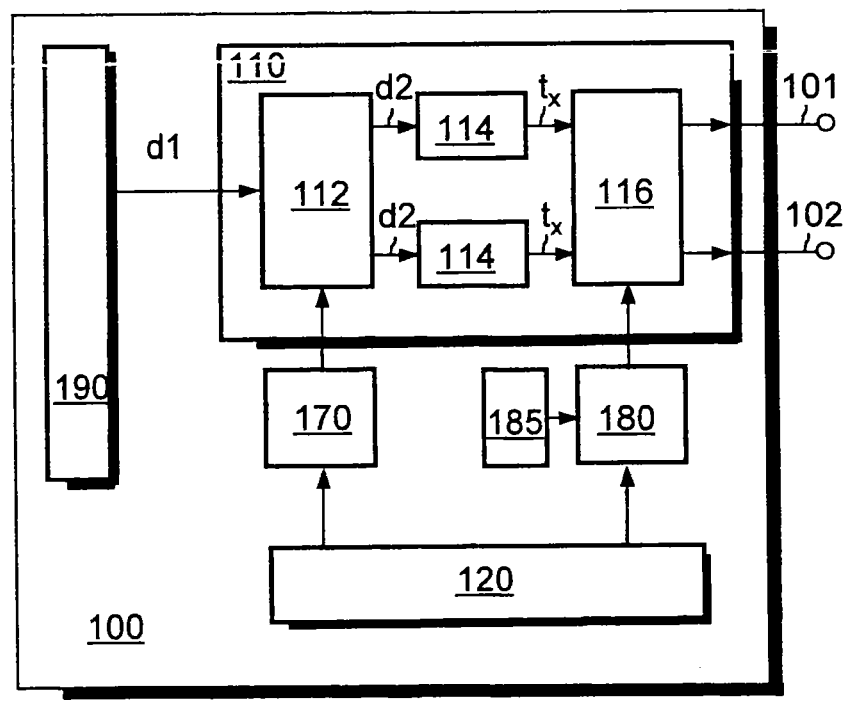
FIG. 1B is a schematic block diagram illustrating the transmitter unit of FIG. 1A according to an embodiment.
Figure 1C:
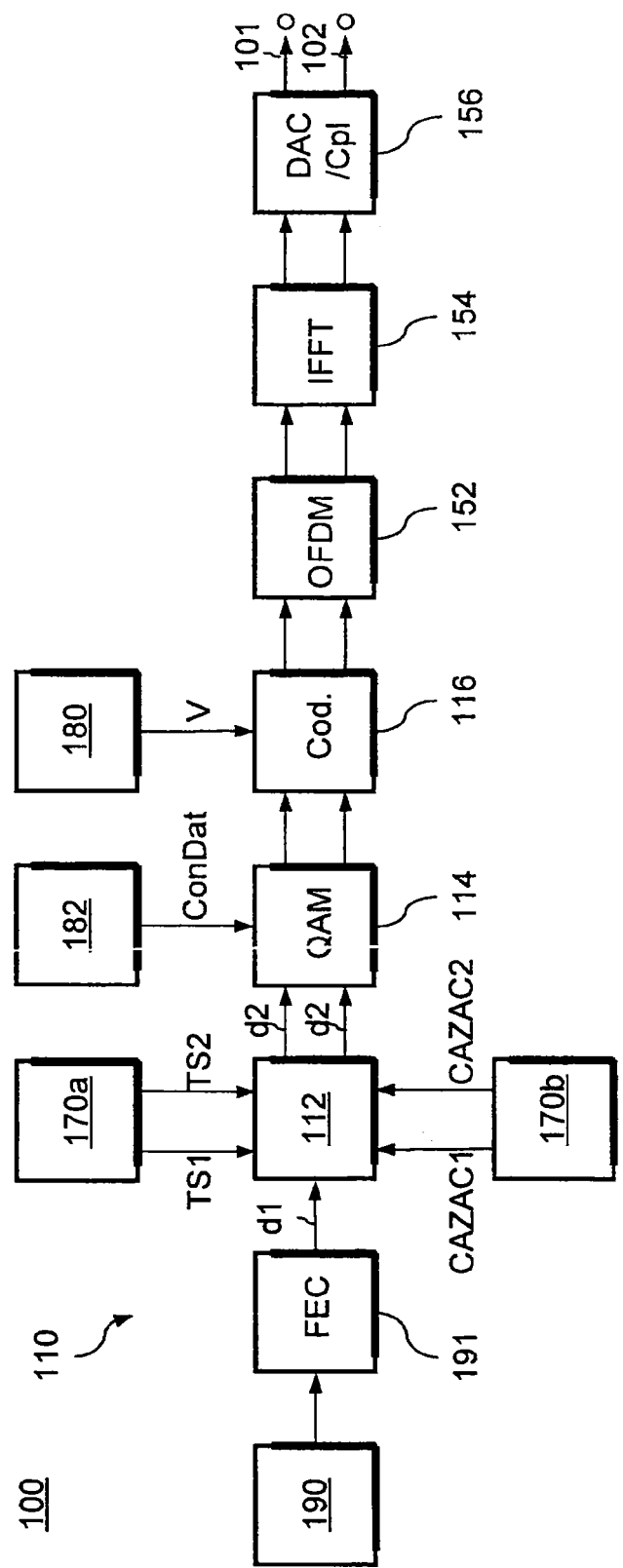
FIG. 1C is a schematic block diagram illustrating details of a transmitter unit in accordance with another embodiment referring to beamforming in the frequency domain.
Figure 1D:
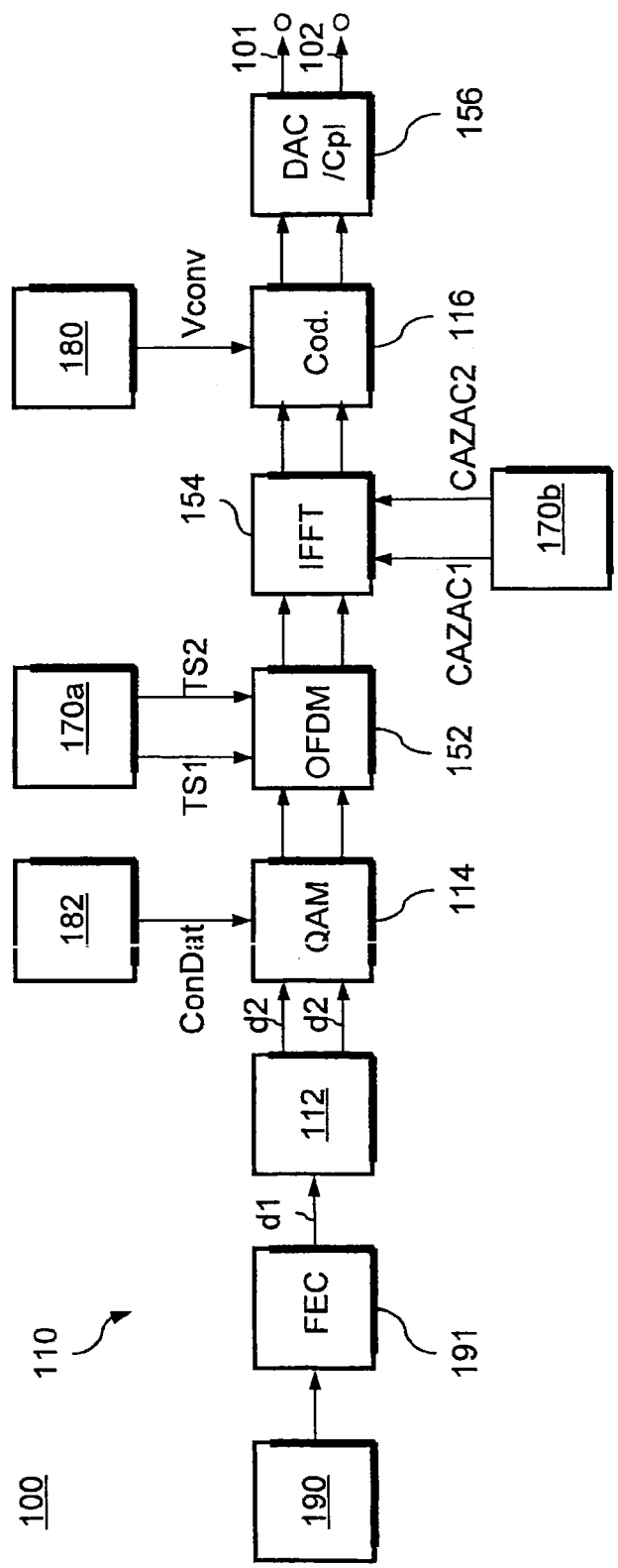
FIG. 1D is a schematic block diagram illustrating details of a transmitter unit in accordance with a further embodiment referring to beamforming in the time domain.
Figure 1E:
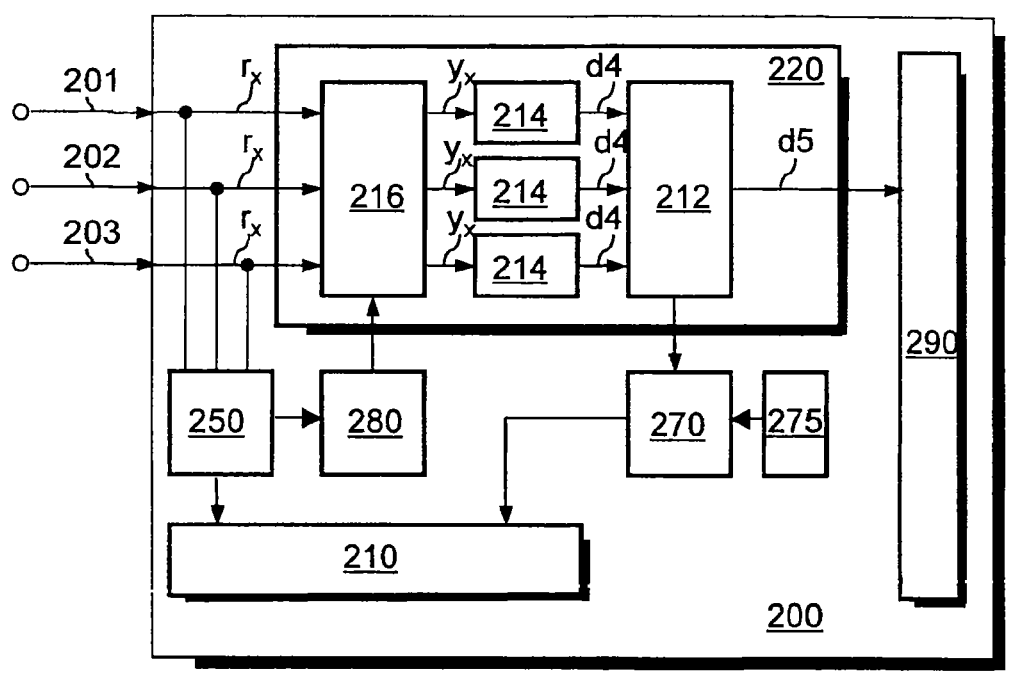
FIG. 1E is a schematic block diagram illustrating the receiver unit of FIG. 1A according to an embodiment.
Figure 1F:
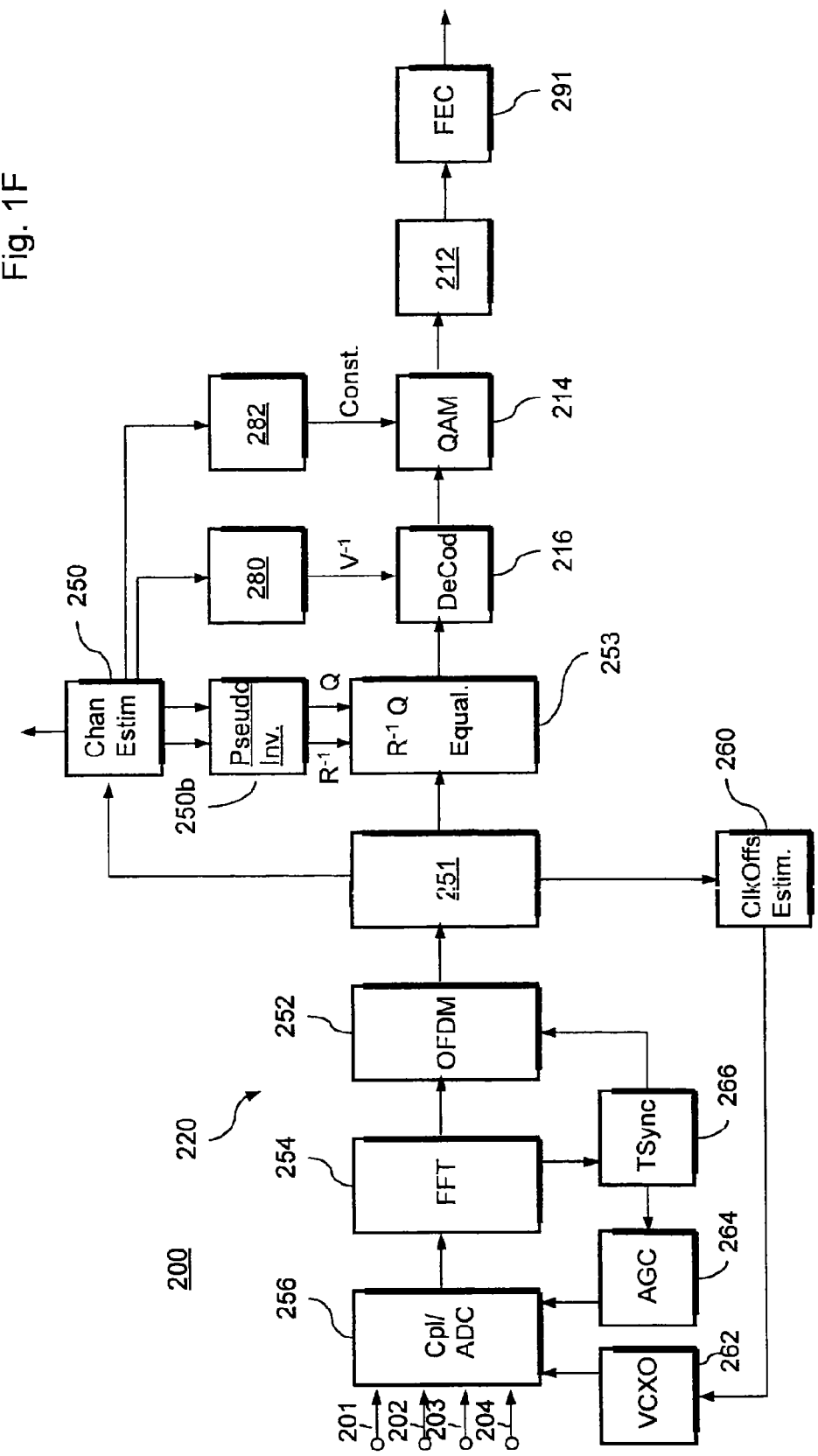
FIG. 1F is a schematic block diagram illustrating details of a receiver unit in accordance with another embodiment referring to beamform-decoding in the frequency domain.
Figure 1G:
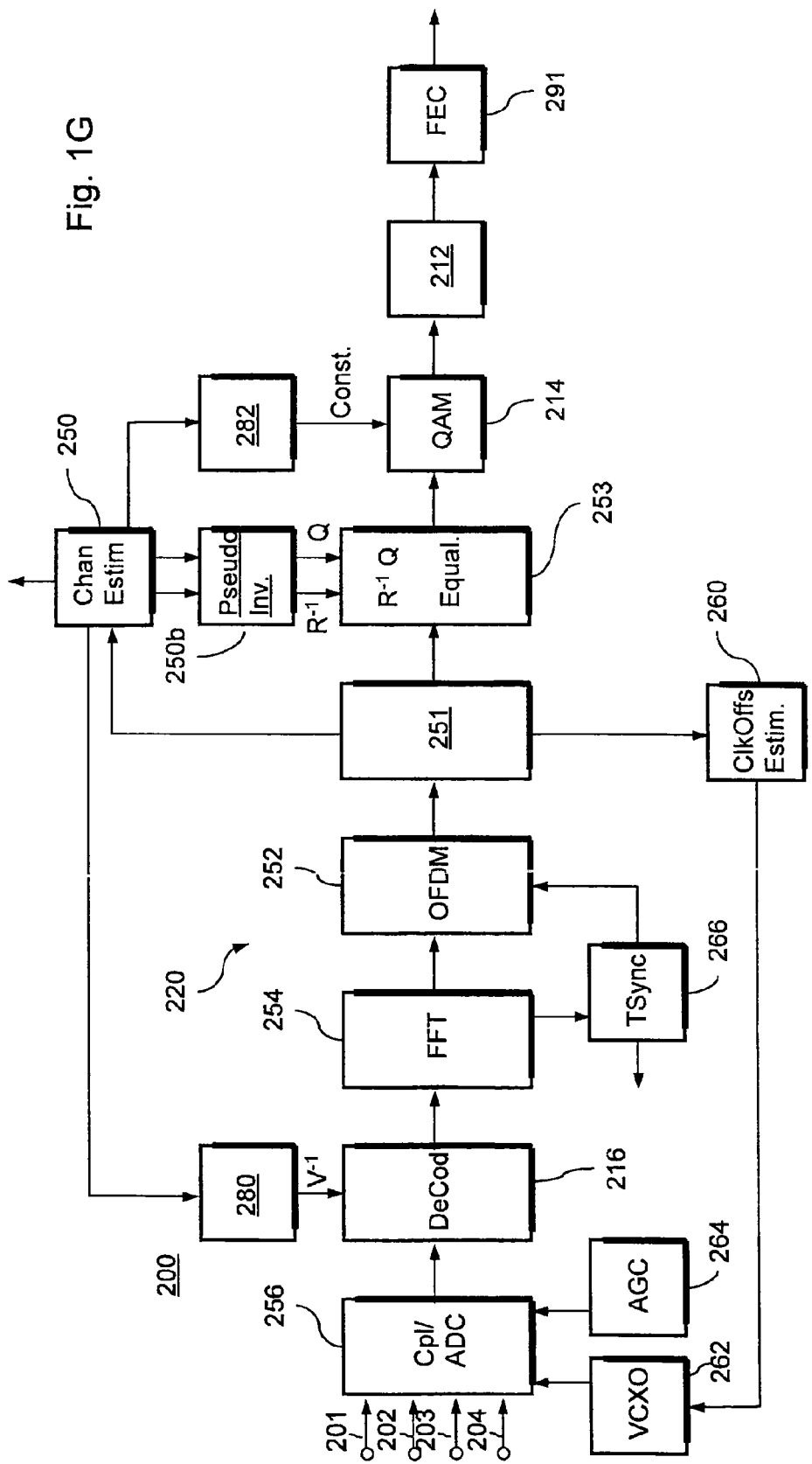
FIG. 1G is a schematic block diagram illustrating details of a receiver unit in accordance with a further embodiment referring to beamform-decoding in the time domain.
Figure 2:
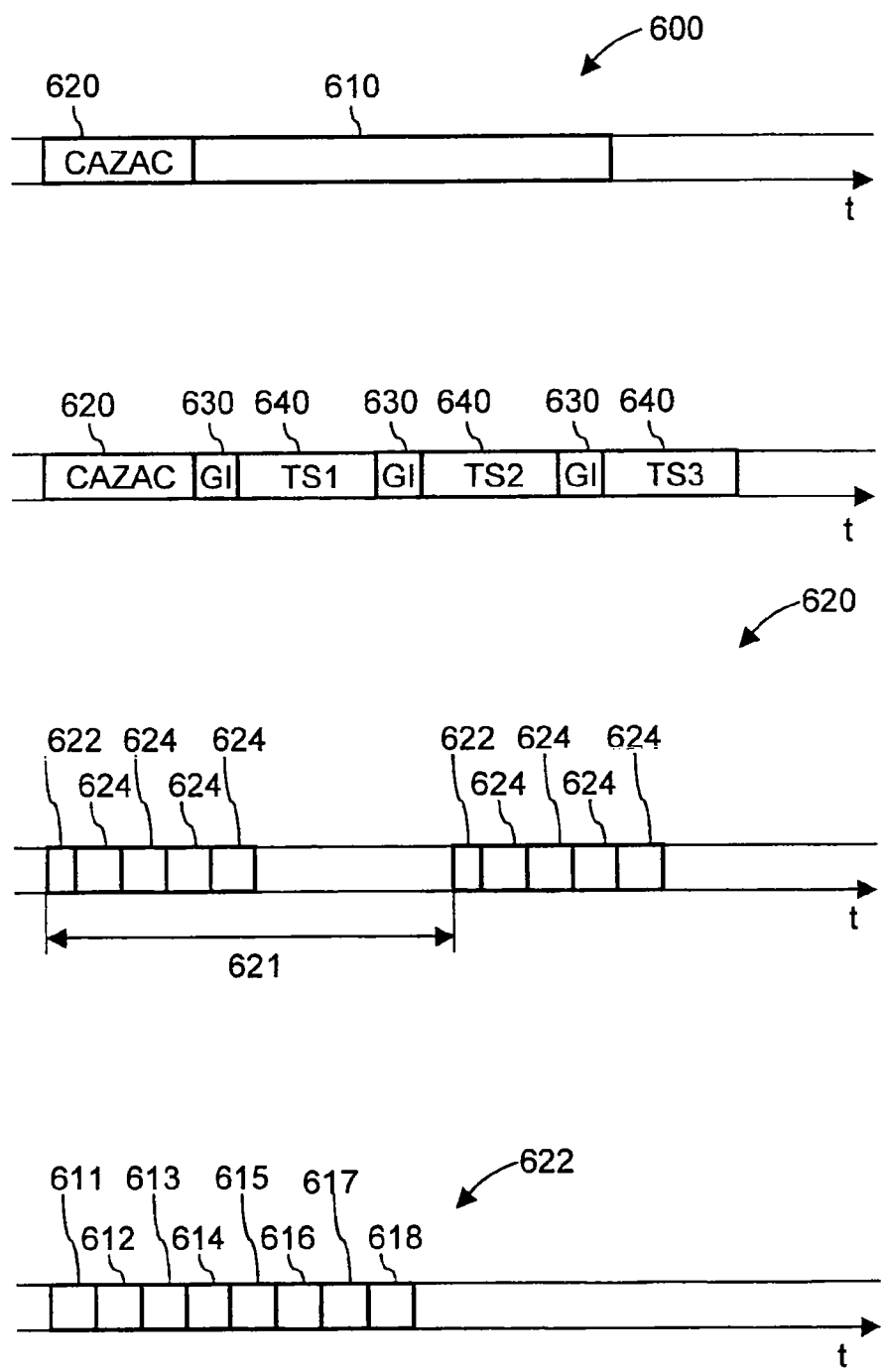
FIG. 2 is a simplified time diagram referring to details of transmission packets for illustrating features of communications devices according to the embodiments.

FIG. 2 shows a transmission packet (burst) 600 for transmitting data from the first to the second communications device 100, 200 of FIG. 1. The transmission packet 600 contains a synchronization sequence (preamble) 620 and a data section 610 following the synchronization sequence 620.

The synchronization sequence indicates a transmission of any data and may also be used for time synchronization of the receiver units. The data section 610 may include payload data or training data or both. The training data may include a plurality of training symbols 640, wherein each training symbol 640 may be headed by a guard interval 630 provided to make the transmission robust versus multipath transmissions.

The guard intervals 630 may contain copies of segments of the training symbols 640, by way of example.

For example, in the context of powerline communications, the synchronization sequence 620 is a constant amplitude zero autocorrelation sequence (CAZAC) that contains data used for synchronizing participating communications devices, which may be similar devices or different devices available from different manufacturers. Typically, the synchronization sequence 620 is aligned to the mains AC voltage line cycle, wherein time slots contained in the synchronization sequence 620 have a specified timing relative to the zero crossings of the AC line cycle.

The synchronization sequence 620 may contain, for each participating communications device, a synchronization signal 622 that includes information for allocating time domain units 624 to the participating communications devices. The synchronization signal 622 may be detected at the communications devices at the receiver side using a correlation analysis and typically does not pass the specific demodulation and error correction path in the receiving communications devices. The synchronization signal 622 may contain several sub-slots 611-618 for system organization.

By applying beamforming on the synchronization sequence 620 and the training symbols 640 transmission of the synchronization sequence 620 and the training symbols 640 becomes more robust. According to an embodiment, the communications devices at the receiver side may determine a feedback information describing how much synchronization information and/or training symbols the receiver unit actually needs for correct demodulation of the received transmit signals. Fed back to the transmitting communications devices, the synchronization feedback information facilitates tailoring the number of training symbols and/or the synchronization sequence to the actual need such that communications resources can significantly be reduced.

According to another embodiment beamforming that includes the synchronization sequence is used for signal extinction at selected locations of the communications system, for example at selected sockets (mains plugs) of an in-house electric power wiring.

FIG. 1B shows a communications device 100 with a transmitter unit 110 as illustrated in FIG. 1A in more detail. A first control unit 190 may output a data stream d1 including payload data to the transmitter unit 110. The data stream may or may not contain training symbols. The transmitter unit 110 includes a serial-to-parallel multiplexer 112 which may split or multiply the data stream d1 into a number M of parallel data streams and which may add synchronization data, for example a synchronization sequence, for each of the M data streams. The number M of data streams is equal to or less than the minimum of the number m of transmit ports and the number n of receive ports, M≤min[n, m]. For example in a system with two transmit ports and three receiving ports, the number M of data streams is equal one or equal two. A MISO system using one receive port uses only one data stream.

The serial-to-parallel multiplexer 112 outputs M data streams d2, which may include a synchronization sequence and either training symbols or payload data or both respectively. The serial-to-parallel multiplexer 112 may be programmable with respect to the synchronization sequence and/or the number of training symbols.

For example, the communications device 100 may include a second control unit 170 which receives feedback information from other communications devices participating in the same communications system and which may program or configure the serial-to-parallel multiplexer 112 in accordance with the received feedback information such that only as many training symbols as actually required are inserted into the transmit data streams and/or such that the synchronization sequence is only as long as required. The second control unit 170 may receive information for determining the current synchronization data via a receiver unit 120 as illustrated in FIG. 1A or via an alternate transmission path.

Each of the data streams d2 is transmitted to one of M modulators 114 respectively. The modulators 114 may be quadrature amplitude modulators (QAM) and each modulator 114 generates a modulated data transmit signal $t_x$.

In accordance with other embodiments, training symbols or the synchronization sequence or both may be inserted in an appropriate form after modulation of the data signals d2.

A precoder unit 116 precodes (beamforms) the modulated data signals $t_x$ according to a beamforming scheme as discussed above to generate the precoded transmit signals. The precoder unit 116 may be characterized by coefficients derived from a precode matrix. The precoder unit 116 may be programmable to realize different precode matrices. For example, during a learning phase, the precode matrix may be the identity matrix such that the precoder unit 116 is transparent for the modulated data signals $t_x$. During an operational phase, the precode matrix $P_{m,m}$ may approximately be equal to the second unitary matrix $V_{m,m}$.

In accordance with another embodiment, the precode matrix $P_{m,m}$ is defined to eliminate the precoded transmit signals at predefined locations. Since a communications system includes a plurality of transmission channels at different frequencies, the elimination of certain transmit signals may be equivalent to a frequency notch filter. A precoder control unit 180 in the first communications device 100 may receive information for determining the precode matrix, for example via the receiver unit 120 as illustrated in FIG. 1, and may be used to configure the precoder unit 116. According to an embodiment, the precoder control unit 180 selects for each channel one of a plurality of predefined matrices stored in a codebook unit 185.

FIG. 1C refers to an embodiment where the transmitter unit 110 of a communications device 100 provides beamforming in the frequency domain. A data source, for example a first controlling unit 190, outputs a primary data stream, which contains payload data but neither training symbols nor synchronization sequences. An FEC (forward error correction) unit 191 inserts code redundancy according to an error detection scheme for facilitating error correction at the receiver side and outputs a first data stream d1. A multiplexer unit 112 may split up the first data stream d1 into at least two complementary data streams d2 or multiplies, at least doubles, the data stream in two or more identical data streams d2.

A modulator unit 114 modulates each data stream d2, for example by using a plurality of sub-carriers and QAM (quadrature amplitude modulation), respectively. The modulator unit 114 may use constellation data ConDat describing frequency dependent channel characteristics for adapting the QAM scheme accordingly. A constellation control unit 182 may derive the constellation data ConDat from feedback information which may be received, for example, via a receiver unit as described with regard to FIGS. 1A and 1B.

According to an embodiment, the multiplexer unit 112 inserts in each of its output data streams d2 training symbols TS1, TS2 or synchronization sequences CAZAC1, CAZAC2 or both. According to another embodiment, the modulator unit 114 inserts in each of its output data streams training symbols or synchronization sequences or both in an appropriate form. The number of training symbols TS1, TS2 and synchronization sequences CAZAC1, CAZAC2 may vary for each output data stream d2 under control of second control unit 170 that may include a first sub-unit 170a assigned to the training symbols and a second sub-unit 170b assigned to the synchronization sequences. The second control unit 170 may receive information for determining the currently required synchronization sequence and/or number of training symbols for each output data stream d2 via the receiver unit 120 as illustrated in FIG. 1A or via an alternative transmission path. According to other embodiments, the second control unit 170 includes only one of the sub-units 170a, 170b.

A precode unit 116 precodes the modulated data signals using a precode matrix V received by a precoder control unit 180 that may provide the precode matrix V on the basis of further feedback information received, for example, via the receiver unit, too. The modulated data signals contain training symbols or synchronisation sequences or both such that beamforming includes beamforming of the training symbols, the synchronisation sequences or both. A further modulator unit 152 of the transmitter unit 110 may modulate the precoded (beamformed) modulated data signals on a frequency carrier using OFDM (orthogonal frequency division modulation). A mixer and inverse Fourier transformation unit 154 combines the orthogonal signals and performs an inverse Fourier transformation for obtaining digital output signals describing the transmit signals in the time domain. A converter and coupling unit 156 converts the digital output signals in analogue transmit signals and couples each analogue transmit signal to a corresponding transmit port 101, 102.

FIG. 1D refers to an embodiment where the transmitter unit 110 of a communications device 100 provides beamforming in the time domain. According to this embodiment, the transmitter unit 110 provides two transmit signals. In accordance with other embodiments, the transmitter unit 110 may provide more transmit signals, for example three, four or more. The precode unit 116 may be provided between the mixer and inverse Fourier transformation unit 154 and the converter and coupling unit 156. The precoder control unit 180 provides a time domain precode matrix Vconv, which may be derived from a frequency domain precode matrix by convolution.

The training symbols TS1, TS2 and synchronization sequences CAZAC1, CAZAC2 may be inserted at the multiplexer unit 112 as described above with reference to FIG. 1C. According to the illustrated embodiment, the second modulation unit 152 inserts the training symbols TS1, TS2 into the respective data stream before performing the modulation in each branch respectively under control of the first sub-unit 170a. According to other embodiments, the number of branches may be not equal two and the number of training symbols may be equal to that of the branches. According to a further embodiment, the mixer and inverse Fourier transformation unit 154 inserts the synchronization sequences CAZAC1, CAZAC2 into the respective data stream under control of the second sub-unit 170b of the second control unit 170 before the orthogonal signals are generated. Again, the number of synchronization sequences may correspond to that of the branches.

FIG. 1E shows a communications device 200 with the receiver unit 220 as illustrated in FIG. 1A in more detail. The communications device 200 receives at one, two, three, four or more input ports 201-203 receive signals. For example, the communications device 200 has three input ports configured to receive differential signals between the live and neutral wires, between the live wire and protective earth and between the neutral wire and protective earth. According to another embodiment, the communications device 200 further comprises a fourth input port configured to receive a common mode signal caused by a leakage current.

A channel estimation unit 250 compares selected receive signals with equivalent nominal signals and determines the channel matrix $H_{n,m}$, for example by selecting, from a plurality of predefined channel matrices, that one that models best the actual transmission channel. Typically, a predefined set of training symbols is known at both the transmitter and the receiver side and the training symbols are selected for channel estimation. The channel estimation unit 250 is further configured to provide channel state information describing the channel matrix for further processing at both the receiver and the transmitter side. For example, information required for determining or directly describing the second unitary matrix $V_{m,m}$ may be provided to the transmitter unit 210 of the second communications device 200. Information required for determining or directly describing the first unitary matrix $U_{n,n}$ may be provided to a decoder control unit 280 of the second communications device 200.

The decoder control unit 280 receives information for determining the decode matrix, which is, for example, the Hermitian transpose $U_{n,n}^H$ of the first unitary matrix $U_{n,n}$, and configures a decoder unit 216 accordingly.

The decoder unit 216 may decode the receive signals $r_x$ according to the beamforming scheme as discussed above to generate the decoded receive signals $y_x$. The decoder unit 216 is characterized be coefficients derived from the decode matrix. The decoder unit 216 is programmable to realize different decode matrices. For example, during a learning phase, the decode matrix may be selected to realize an equalizer or detection function for detecting the transmitted MIMO paths, for example a zero forcing receiver. During an operational phase, the decode matrix may be approximately equal to the Hermitian transpose $U_{n,n}^H$ of the second unitary matrix $U_{n,n}$. In accordance with another embodiment the decode matrix is adapted to a precode matrix, which eliminates transmit signals at predefined locations.

Each of the data streams output by the decoder unit 216 is demodulated by one of a number N of demodulators 214 respectively. The demodulators 214 may be quadrature amplitude demodulators (QAD). Each demodulator 214 generates a demodulated data signal d4, which is output to a parallel-to-serial demultiplexer 212.

The demultiplexer 212 may combine the N data signals d4 to one, two or more data streams d5, which are transmitted to a control unit 290. In addition, the demultiplexer 212 may include or may be connected to a qualification unit 270 checking the quality of synchronization data, for example of a synchronization sequence, and training symbols. In dependence on the quality, the qualification unit 270 determines a feedback information describing, for example, the minimum length of a synchronization sequence and/or the minimum training symbol number ensuring undisturbed data transmission over the current transmission channel.

At least then when the determined minimum length of a synchronization sequence deviates from the length of the received synchronization sequence or when the determined minimum training symbol number deviates from the number of received training symbols, the qualification unit 270 outputs an updated feedback information, for example to the transmitter unit 210. In accordance with other embodiments the feedback information and the channel state information is delivered to the control unit 290 and the control unit 290 inserts the feedback information and/or the channel state information into a data stream output from the control unit 290 to the transmitter unit 210. According to an embodiment, the qualification unit 270 transmits an index of one of a plurality of predefined matrices stored in a codebook unit 275 as channel state information.

For each second communications device 200 that is assigned to the same first communications device 100 via a transmission channel, different feedback information may be provided and the first communications device 100 may tailor the synchronization data length and/or training symbol number for each of the second communications 200 devices individually to save transmission resources.

In accordance with another embodiment beamforming is used to eliminate a transmit signal, which is transmitted from a first communications device connected to a first outlet of a power line wiring to a second communications device connected to a second outlet of the power line wiring, at a third outlet. Tailoring the equivalent channels at the transmitter side may suppress interferences with other communications systems, for example other PLT systems or radio broadcasting services.

FIG. 1F refers to details of an embodiment where the receiver unit 220 of a communications device 200 provides decoding in the frequency domain. The illustrated embodiment refers to a transmitting communications device (not shown) driving two transmit signals, and a receiving communications device 200 receiving two or more, for example four, receive signals via input ports 201-204. A couple and converter unit 256 samples the analogue receive signals and may output two or more, for example four, digital receive signals, wherein the couple and converter unit 256 may adjust the signal levels of the receive signals in response to information provided by an AGC (automated gain control) unit 264.

A Fourier transformation unit 254 transforms the digital receive signals into the frequency domain, wherein for each digital receive signal a digital data stream may be generated. Further amplitude and phase information may be obtained from the receive signals for controlling a synchronization unit 266 that may provide information used by the AGC unit 264 for adjusting the signal levels. A first demodulator unit 252 may use OFDM to decompose, in the frequency domain, each data stream into two orthogonally modulated components. According to an embodiment, synchronization information provided by the synchronization unit 266 may be used for the demodulation.

A splitter unit 251 may be provided that routes the two or more, for example four, data streams output by the first demodulator unit 252 to an equalizer unit 253 and a channel estimation unit 250. According to a further embodiment, the splitter unit 251 routes all or some of the data streams to a clock offset estimation unit 250 which provides a control signal for a voltage controlled oscillator controlling the sampling of the analogue receive signals in the couple and converter unit 256.

The channel estimation unit 250 is used to determine various channel characteristics. For example, it may be configured to determine the entries of the channel matrix H describing the mutual effects between the receive signals. In addition, the channel estimation unit 250 may be configured to determine a tonemap describing frequency characteristics of each path of the transmission channel. Information obtained by the channel estimation unit 250 may be used by a decoder control unit 280 to determine the decoder matrix $V^{-1}$ of a decoder unit 216. In accordance with another embodiment, information obtained by the channel estimation unit 250 may be used by a modulator control unit 282 to determine coefficients for a second demodulator unit 214. In addition, information obtained by the channel estimation unit 250 may be used by a pseudo inversion unit 250b to determine coefficients of the equalizer unit 253. Further, the information obtained by the channel estimation unit 250 may be fed back to the transmitting communications device that transmits the currently received receive signals.

The equalizer unit 253 may be used to resume from the data streams representing the two or more, for example four, receive signals two or more data streams representing the original transmit signals. The decoder unit 216 decodes the data streams using the decoder matrix $V^{-1}$. The second modulator unit 214 may perform a QAM demodulation that may or may not use tonemap information and performs an inverse Fourier transformation to obtain two or more receive signals. A demultiplexer unit 212 recombines the two or more receive signals to a resulting receive signal. A forward error correction unit 291 uses the included code redundancy for detecting and correcting data errors. The decoding is performed in the frequency domain. The embodiment of FIG. 1G differs from that illustrated in FIG. 1F in that decoding is performed in the time domain. For example, the decoder unit 216 may be arranged between the couple and converter unit 256 and the Fourier transformation unit 254, receives the two or more, for example four, digital receive signals and outputs decoded digital receive signals to the Fourier transformation unit 254.

Figure 3:
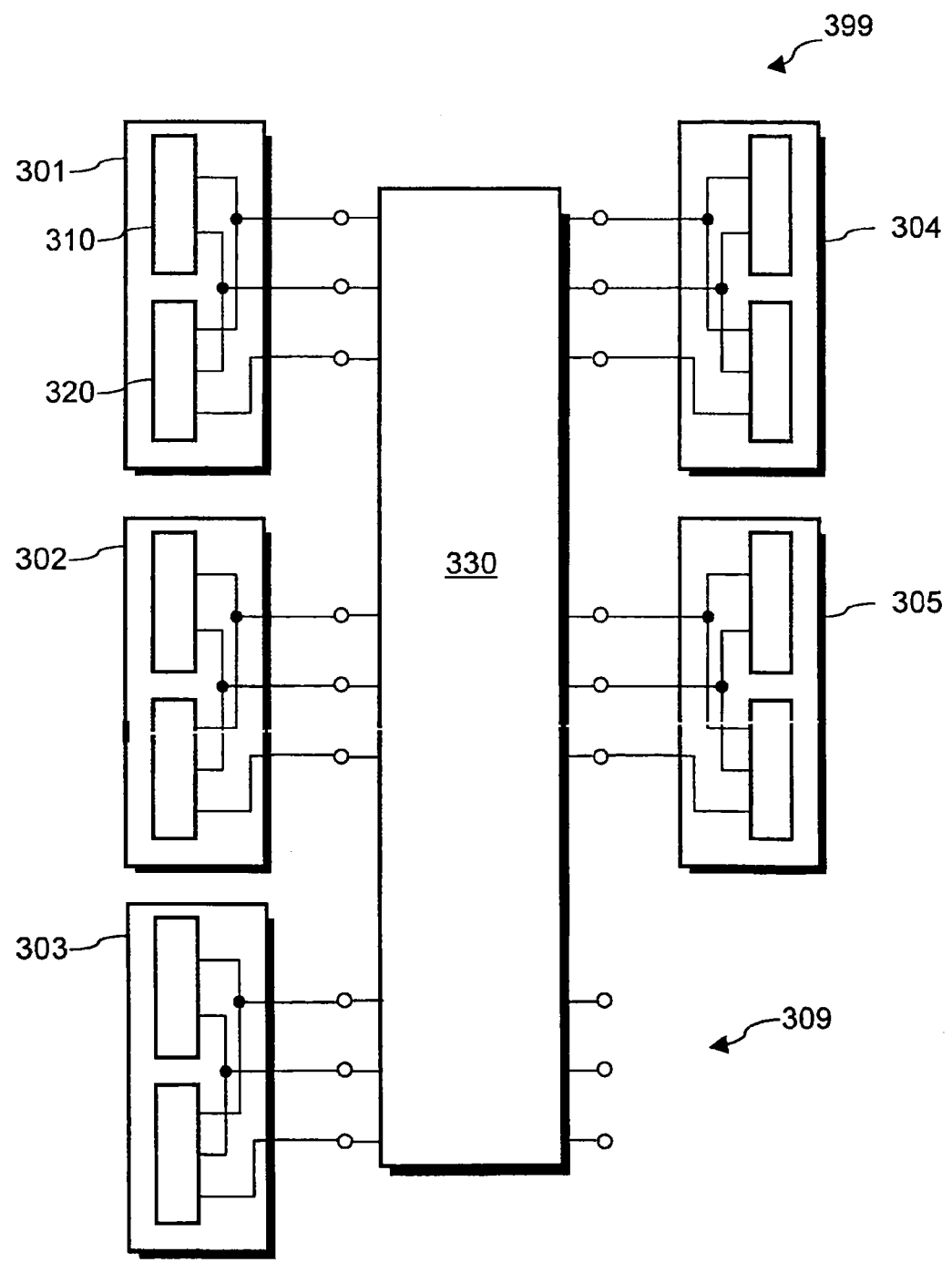
FIG. 3 is a schematic block diagram of a MIMO communications system in accordance with another embodiment.

FIG. 3 shows a communications system 399 with a plurality of communications devices 301-305. The communications devices 301-305 may be bidirectional devices comprising a receive unit 320 and a transmit unit 310, exclusively receiving devices including a receive unit 320 or exclusively transmitting devices including a transmit unit 310, provided that at least one of the communications devices 301-305 contains a transmit unit 310. The communications devices 301-305 are connected to a power line wiring 330, for example an in-house electric power wiring. The power line wiring 330 has a further monitored interface 309, for example an outlet (mains socket), at which as less transmit signal power as possible should be detectable, for example, because the monitored outlet 309 is provided for connecting an electronic device, which functionality may be disturbed by the transmit signals of the communications devices 301-305.

Between five bidirectional communications devices 301-305, the power line wiring 330 provides 20 different transmission channels. Each communications device 301-305 may hold four precode matrices and may precode the data to be transmitted to one of the other communications devices 301-305, e.g. payload data or synchronization data or both, with the respective precode matrix obtained from channel state information received from the respective communications device 301-305 and/or from the monitored outlet 309.

According to an embodiment, the precode matrix in each communication device 301-305 is determined such that the transmit signal is as low as possible at the monitored outlet 309, or such that the ratio between the receive signals at the addressed receiver unit 320 and the monitored outlet 309 is as high as possible. In accordance with other embodiments, the transmit signals may be attenuated at more than one outlet.

Figure 4A:
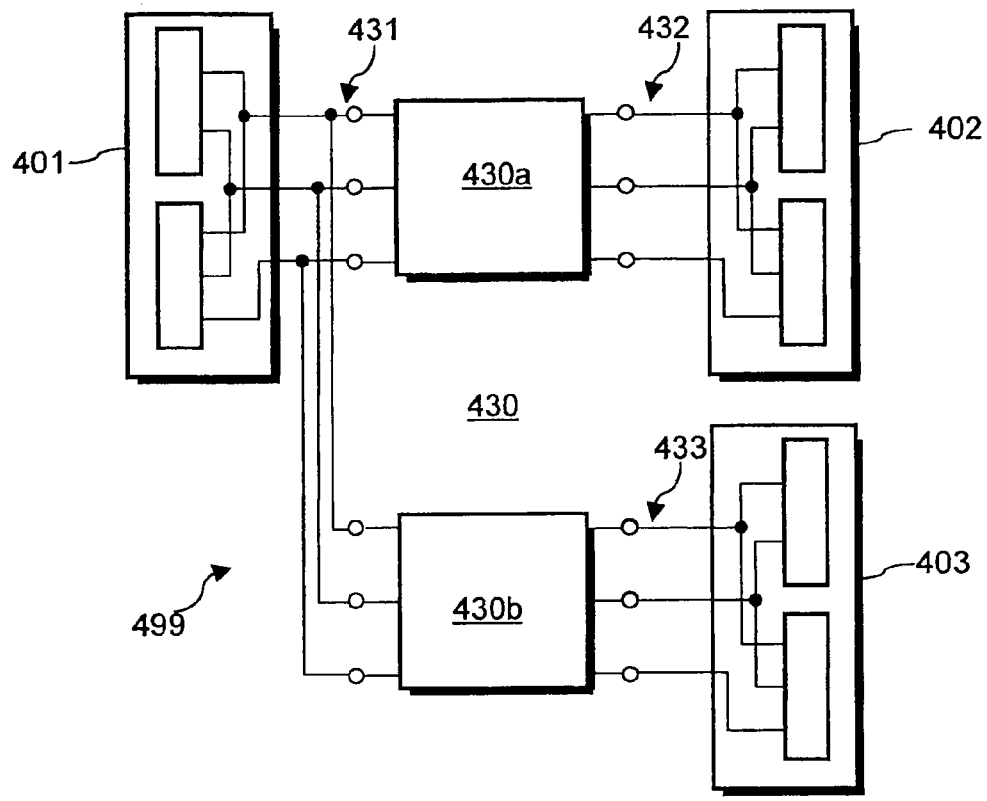
FIG. 4A is a schematic block diagram illustrating a MIMO communications system using an in-house electric power wiring according to another embodiment in a first state in which a temporarily connected communications device is connected to an outlet of the in-house wiring.

FIG. 4A shows a communications system 499 in a first state. The communications system 499 includes a first and a second communications device 401, 402 and a first transmission channel 430a for data transmission from the first to the second communications device 401, 402. The communications devices 401, 402 may be provided at a first and a second outlet 431, 432 of a power wiring system, e.g. an in-house electric power wiring 430. A second transmission channel 430b defines data transmission between the first outlet 431 and a third outlet 433 of the same power wiring system 430. In the first state, a third communications device 403 is connected to the third outlet 433. The third communications device 403 determines channel state information describing the second transmission channel 430b and transmits the channel state information to the first communications device 401.

The channel state information may or may not contain an elimination identifier identifying the respective outlet as an outlet at which signals shall be extinguished, at least in a certain frequency range. For example, if the third outlet 433 is provided for the connection of an electronic device which is sensitive to electromagnetic radiation within the transmit signal bandwidth, for example a radio broadcast tuner, the elimination identifier is set. The elimination identifier may also contain information identifying frequency ranges for which extinction is desired.

If the channel state information does not contain the elimination identifier, the first communications device 401 marks the third communication device as permanent device and may select the precode matrix for the second and the third outlets 432, 433 according to a beamforming scheme which ensures a high SNR for signals transmitted from the first 401 to the third communications device 403 and from the first 401 to the second communications device 402. If the channel state information does contain an elimination identifier, the first communications device 401 marks the third outlet 433 as monitored outlet and may select the precode matrix for the second outlet 432 according to a beamforming scheme which ensures, on the one hand, at the third outlet 433 either a low medium signal level or a low medium signal level in selected frequency bands, and a high SNR for signals transmitted from the first 401 to the second communications device 402 on the other hand.

As discussed above, the elimination identifier may be set in the third communications device 403, e.g. if the third outlet 433 is provided for the connection of an electronic device which is sensitive to electromagnetic radiation within the transmit signal bandwidth. The elimination identifier may be set by user interaction, e.g. by means of a switch or via an electric input port. In accordance with another embodiment, the first communications device 401 sets the elimination identifier internally, when a specific communications device has been disconnected, e.g. when the third communications device 403 has been disconnected from the third outlet 433.

Figure 4B:
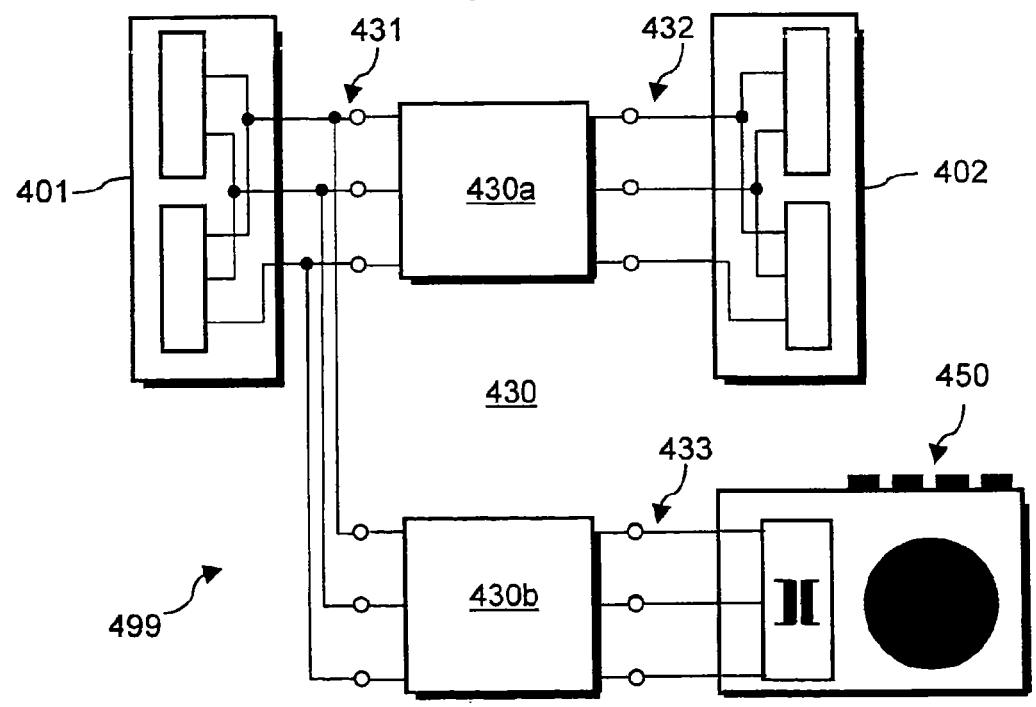
FIG. 4B is a schematic block diagram illustrating the MIMO communications system of FIG. 4A in a second state in which the temporarily connected communications device is replaced with a consumer application device.

FIG. 4B shows the communications system 400 of FIG. 4A in a second state after the third communications device 403 has been disconnected from the power wiring system 430 and after a radio receiver 450 has been connected to the third outlet 433. If the first communications device 401 precodes the signals transmitted to the second communications device 402 such that selected frequency bands at the third outlet are suppressed, the radio receiver receives the broadcast signals without interference caused by the communications system 400.

Figure 5:
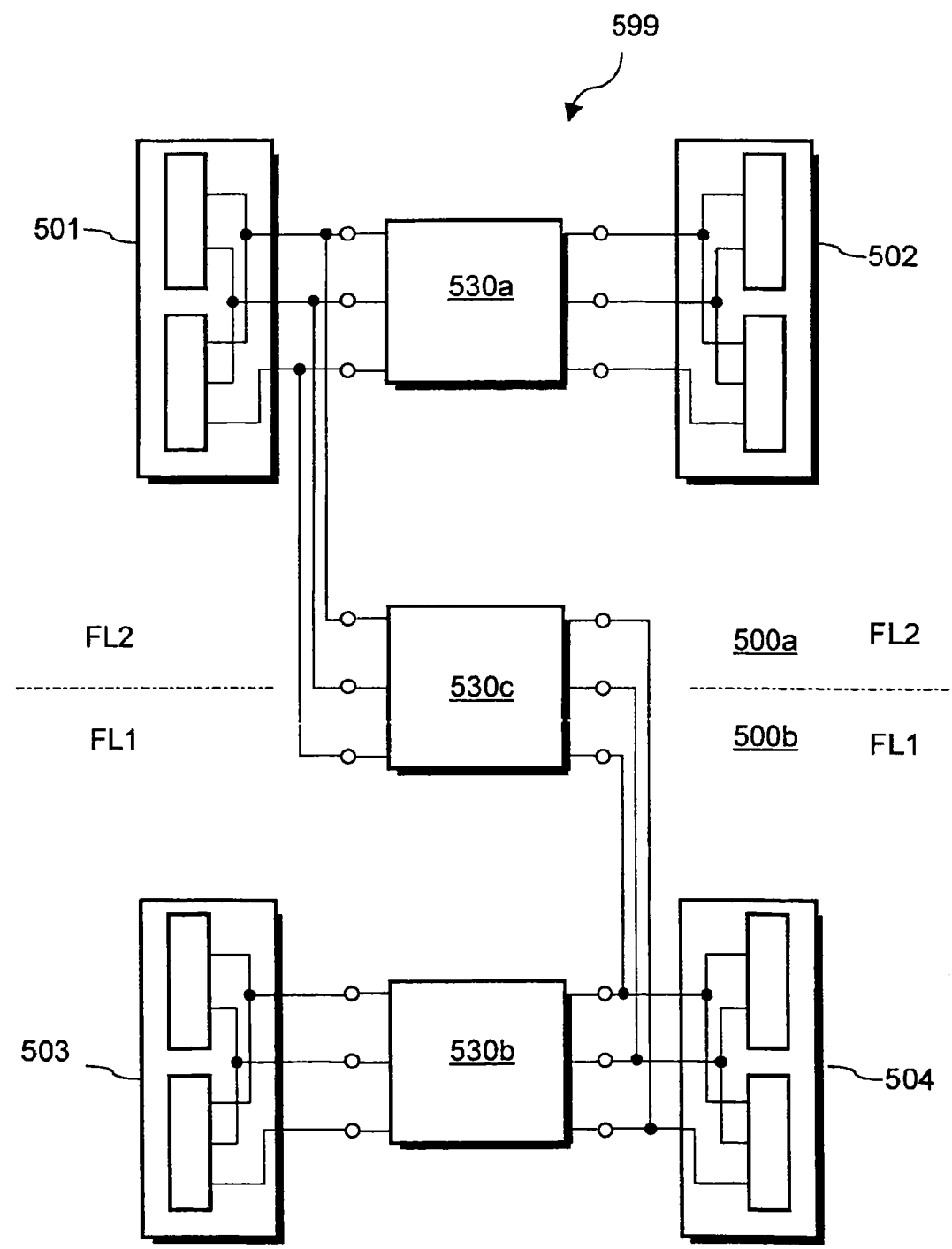
FIG. 5 is a schematic block diagram illustrating a MIMO communications system including two independent MIMO sub-systems and an interfering channel between the MIMO sub-systems in accordance with a further embodiment.

FIG. 5 refers to a communications system 599 including a first communications subsystem 500a with a first and a second communications device 501, 502 and a first transmission channel 530a for data transmission from the first to the second communications device 501, 502 and a second communications subsystem 500b with a third and a forth communications device 503, 504 and a second transmission channel 530b for data transmission from the third to the forth communications device 503, 504. The first and second communications sub-systems 530a, 530b may be provided at different flats FL1, FL2 of a building at outlets of an in-house electric power wiring, by way of example. When the first communications device 501 transmits signals to the second communications device 502 crosstalk with the second communications sub-system 500b may occur resulting in a third transmission channel 530c interfering, for example, with the second transmission channel 530b at the forth communications device 504.

In accordance with an embodiment, in a learning phase, the forth communications device 504 may deliver channel state information describing the third transmission channel 530c to the first communications device 501. Then the first communication device 501 may tailor its precode matrix used for data transmission to the second communications device 502 such that the receive signal level at the forth communications device 504 resulting from the third transmission channel 530c is as low as possible, or that, for a signal transmitted from the first communications device 501, a ratio between the receive signal level at the second communications device 502 and the receive signal level at the third communications device 503 is as high as possible.

Figure 6:
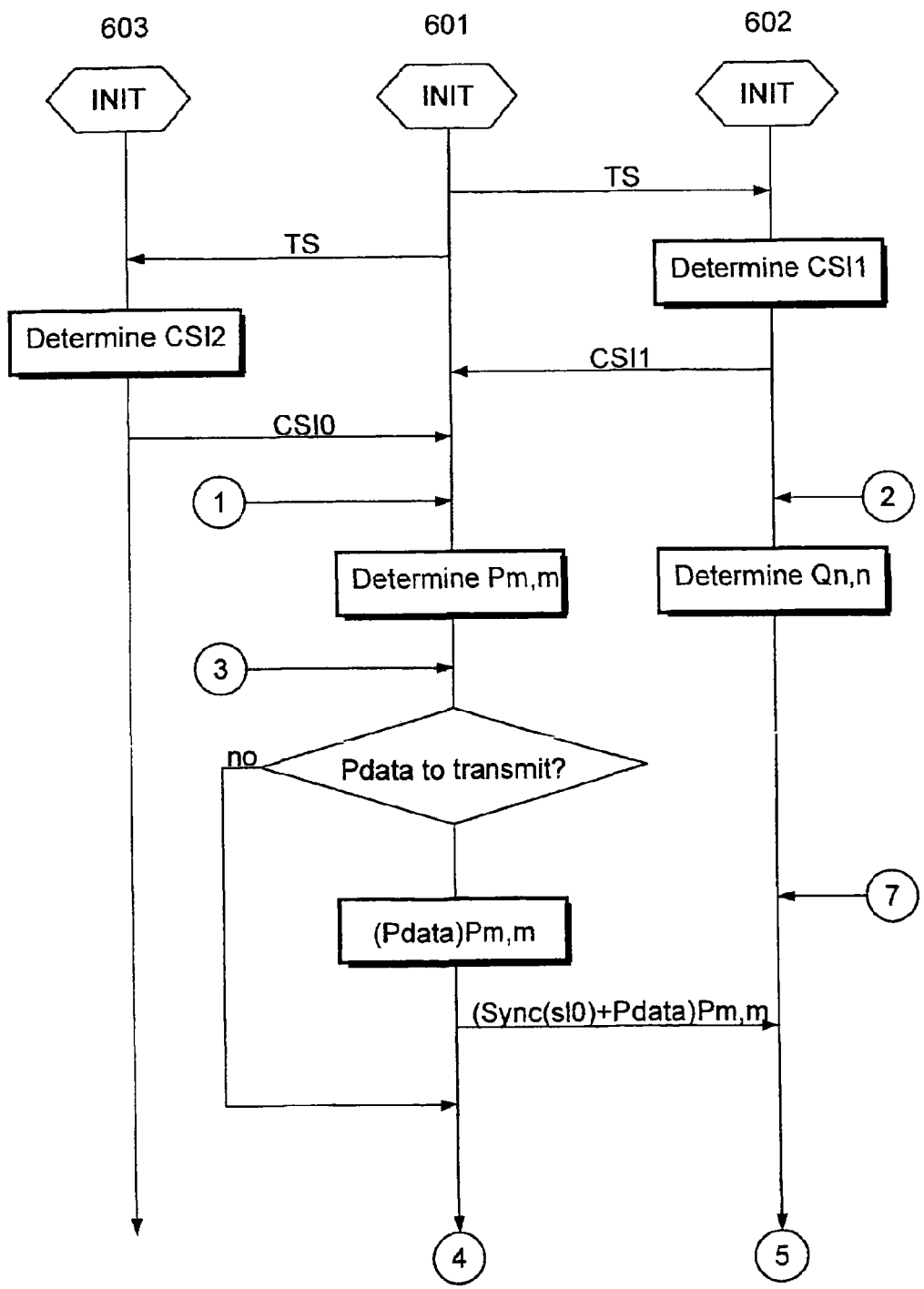
FIG. 6 is a schematic timing diagram illustrating a method of operating a MIMO communications system in accordance with another embodiment.
Figure 6:
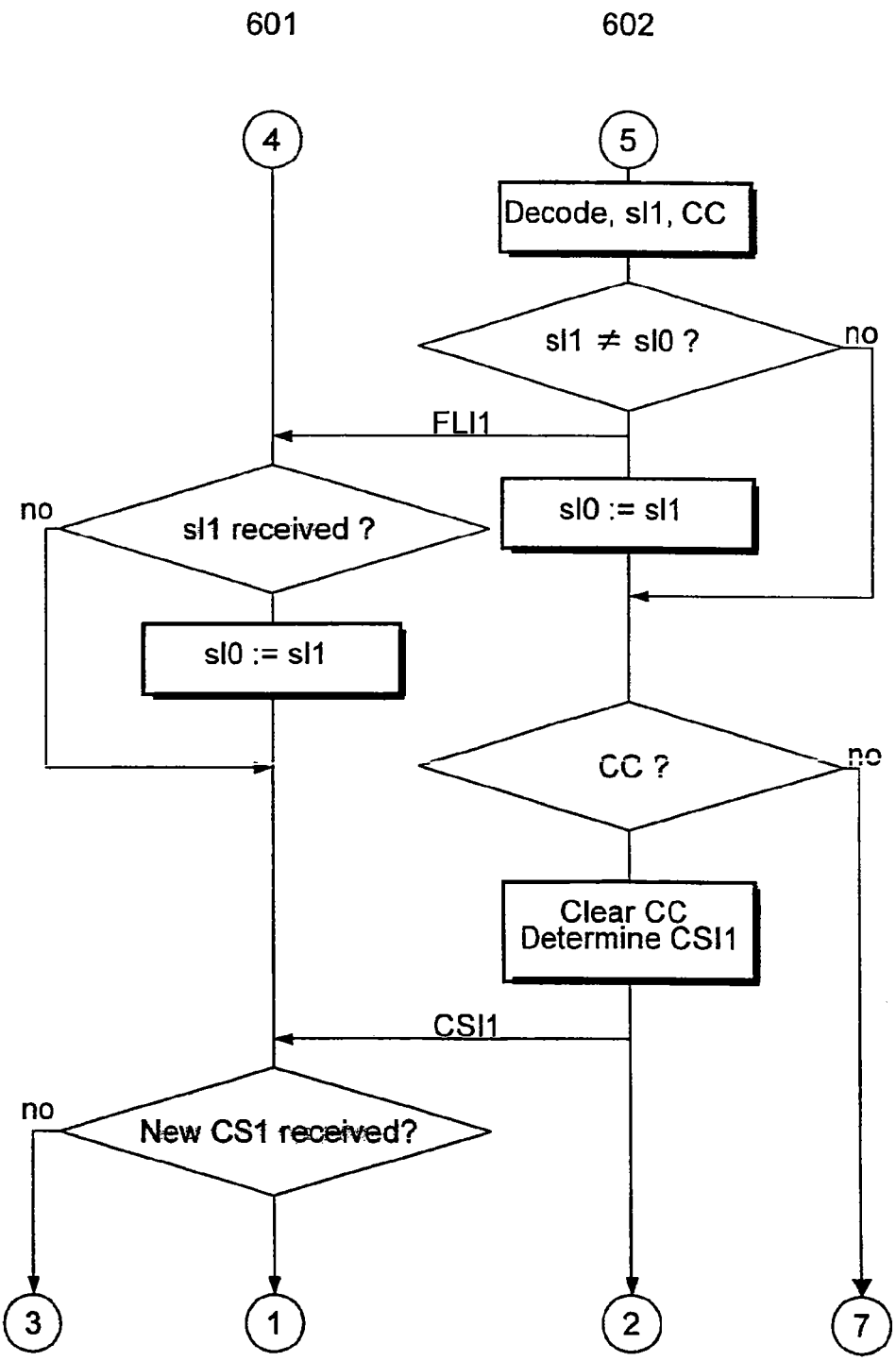

FIG. 6 refers to a method of operating a communications system using precode matrices for beamforming. During an initialization phase, a communications device 601, 602, 603 sets communications parameters to predefined values. For example a synchronization length indicating, e.g. the length of a synchronization sequence and/or a number of training symbols is set to a predetermined value and a precoder matrix used in a transmit unit of the communications device is set to be transparent.

In a subsequent learning phase, the first communications device 601 may transmit uncoded training symbols TS to further communications devices, for example to a second communications device 602 provided for receiving transmit signals from the first communications device 601 and to a third communications device 603 which shall receive as less signal power as possible.

The second and third communications devices 602, 603 determine channel state information CSI1, CSI2 describing the transmission channels from the first 601 to the second communications device 602 and from the first 601 to the third communications device 603. In addition, at least the second communications device 602 determines a decode matrix $Q_{n,n}$, for example the Hermitian transpose of the first unitary matrix resulting from a SVD of the channel matrix obtained from the channel state information CSI1.

On the basis of the received channel state information CSI1, a precoder control unit in the first communications device 601 determines an optimum precode matrix $P_{m,m}$ for encoding data that is to be transmitted from the first 601 to the second communications device 602. According to an embodiment, the precode matrix $P_{m,m}$ is selected to achieve an optimum SNR for decoded receive signals at the second communications device 602. For example, the precode matrix $P_{m,m}$ may be the second unitary matrix $V_{m,m}$ resulting from a SVD of the channel matrix. According to other embodiments, the precode matrix $P_{m,m}$ is selected to ensure a minimum signal energy at the third communications device 603 or a signal energy that does not exceed a predetermined level at the third communications device 603. In accordance with further embodiments, the precode matrix $P_{m,m}$ may be selected such that the ratio between the signal levels at the first 601 and the third communications devices 603 is as high as possible. According to yet another embodiment, the precode matrix $P_{m,m}$ may be selected such that the sum of distances between the precode matrix $P_{m,m}$ and an optimum precode matrix with respect to the second communications device and between the precode matrix $P_{m,m}$ and an optimum precode matrix with respect to the third communications device is as low as possible. This scheme may be applied to more than three communications devices in an equivalent way.

With determination of the precode and decode matrices $P_{m,m}$, $Q_{n,n}$ the learning phase may be completed and the communications devices 601, 602 pass over to an operational mode, in which, when in the first communications device 601 payload data Pdata stands to be transmitted to the second communications device 602, the first communications device 601 precodes a transmission packet, which may contain a synchronization sequence Sync with a synchronization length sl0 and either payload Pdata or a predefined number of training symbols or both, by means of the precode matrix $P_{m,m}$ and transmits the precoded transmission packet to the second communications device 602.

The second communications device 603 decodes the received transmission packet using the decode matrix $Q_{n,n}$.

The second communications device 602 may check how much synchronization data, for example how many training symbols TS are actually required to ensure undisturbed reception of the signals transmitted from the first communications device 601 and may transmit an updated feedback information sl1 describing, for example, the minimum required number of training symbols TS or the minimum required synchronization sequence length to the first communications device 601. The first communications device 601 may taylor the number of training symbols TS or the synchronization sequence length in the next transmission packet in accordance with the received feedback information sl0 in order to increase the transmission capacity for the payload data.

Alternatively or in addition, the second communications device 602 may check whether a significant change of the transmission properties has occurred. When the second communications device 602 detects a significant channel change, the second communications device 602 may update its channel state information CS1 and may signal the channel change CC and/or an updated channel state information CS1 to the first communications device 601. The second communications device 602 determines an updated decode matrix $Q_{n,n}$, for example the Hermitian transpose of the first unitary matrix resulting from a SVD of the new channel matrix obtained from the updated channel state information CSI1.

In accordance with an embodiment, the precoder control unit determines the new optimum precode matrix $P_{m,m}$ on the basis of the updated channel state information CSI1 and the previously used precode matrix $P_{m,m}$ as described in detail in the following:

A first channel matrix $H_1$ describes the transmission channel before the channel change and the first communications device 601 uses the second unitary matrix $V_1$ obtained by SVD of $H_1$ according to equation (7) as precode matrix.

$$H_1 = U_1 D_1 V_1^H \qquad (7)$$

When the second communications device 602 detects a significant channel change, the second communications device 602 compares the received precoded and decoded training symbols contained in the received signal with nominal training symbols, which may be stored or which may be in other way available in the second communications device 602. In this way a new equivalent channel matrix H can be obtained. In accordance with another embodiment the second communications device 602 may detect the significant channel change by evaluating the received precoded and decoded training symbols.

After having detected a channel change, the second communications device 602 performs a further SVD. Since at this point in time the transmit signals are precoded with $V_1$ and transmitted via the new transmission channel $H_2$, the new equivalent channel $H = H_2 V_2$. Applying SVD to the new equivalent channel H gives equation (8):

$$H_2 V_1 = U D V^H \qquad (8)$$

$V^H$ is the Hermitian transpose of the optimum precode matrix V for the new equivalent channel. In equation (8) the new channel matrix $H_2$ can be replaced with the result of 1st SVD, $H_2 = U_2 D_2 V_2^H$:

$$U_2 D_2 V_2^H V_1 = U D V^H \qquad (9)$$

By comparing both sides of equation (9) equations (10) and (11) can be obtained:

$$V_2^H V_1 = V^H \qquad (10)$$

$$V_2 = V_1 V \qquad (11)$$

According to equation (11), the updated precode matrix $V_2$ for the new channel matrix $H_2$ may be obtained from the previously applied precode matrix $V_1$ and the SVD of the new equivalent channel $H_2 V_1$ and without knowledge of the new, channel matrix $H_2$. No uncoded training symbols have to be transmitted for determining the new precode matrix $V_2$.

Equivalent considerations apply for the decode matrix and the diagonal matrix. No uncoded training symbols have to be transmitted for determining the new decode matrix and the new diagonal matrix.

The second communications device 602 transmits a precode update information, for example the channel state information, to the first communications device 601. The precode update information specifies the precode matrix. In accordance with an embodiment, the second communications device 602 transmits values specifying the entries of the new precode matrix or values from which the entries of the new precode matrix may be derived. In accordance with another embodiment, the first and second communications devices 601, 602 contain identical codebooks and look-up tables, wherein each codebook contains a set of predefined precode matrices, and the second communications device 602 transmits an index specifying one of the codebook entries as the best fitting precode matrix. If the channel changes a second time, the scheme may be reiterated or the channel may be newly estimated on the basis of uncoded training symbols.

Figure 7:
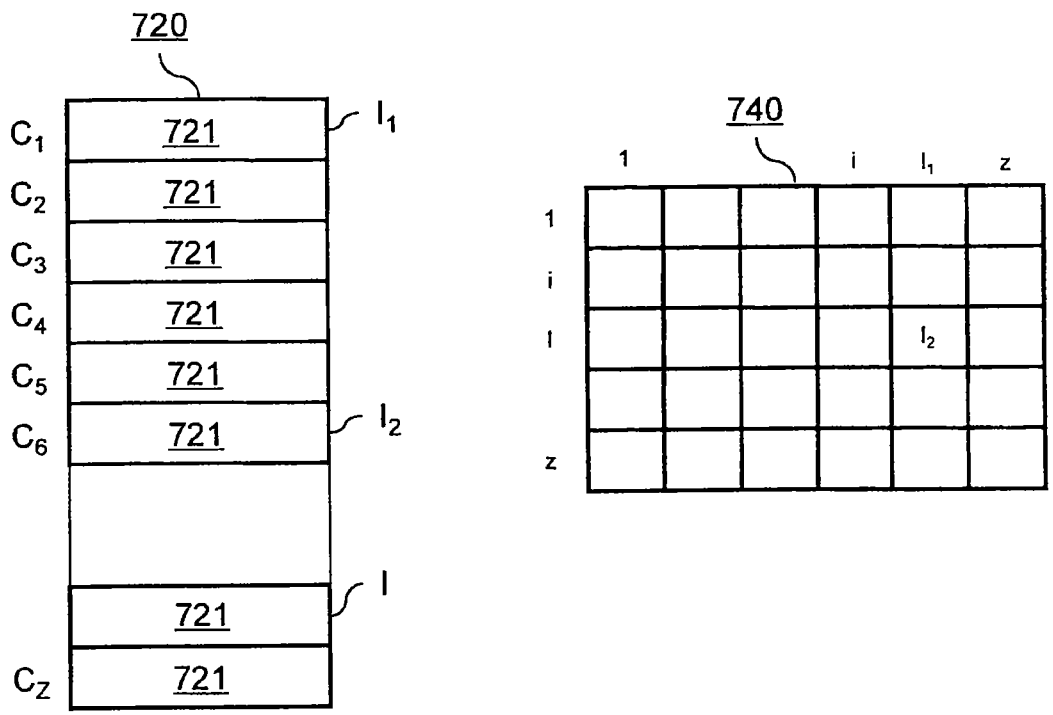
FIG. 7 is a schematic block diagram illustrating a codebook and a look-up table for illustrating a method of determining a beamforming matrix in accordance with another embodiment.

FIG. 7 refers to a codebook 720 containing z entries $c_1$-$c_z$. Each entry $c_1$-$c_z$ is a predefined matrix 721 with the dimension of a precoder matrix. The predefined matrices 721 differ from each other. The same codebook 720 may be provided in each communications device participating in the same communications system. Each codebook 720 may be stored in a codebook unit.

FIG. 7 further illustrates a look-up table 740 containing $z^2$ entries $c_{1,1}$-$c_{z,z}$. Each entry $c_{i,j}$ of the look-up table 740 identifies a precode matrix. For example, each entry $c_{i,j}$ of the look-up table 740 is an index identifying one of the entries of the codebook 720. Each entry $c_{i,j}$ corresponds to the matrix product of two of the predefined matrices 721 contained in the codebook 720.

For example, the entry $c_{m,n}$ in the look-up table 740 is a pointer to the codebook entry $c_k$, identifying that predefined matrix 721 that fits best with the product matrix obtained by multiplying the predefined matrix 721 identified by codebook entry $c_m$ with the predefined matrix 721 identified by codebook entry $c_n$. In other words, the look-up table 740 is generated by multiplying for i=1 to z and j=1 to z the predefined matrices 721 identified by $c_i$ and $c_j$. The result is compared with each predefined matrix 721 and the entry number $c_m$ identifying that predefined matrix 721 that fits best with the calculated matrix product is stored as look-up table entry $c_{i,j}$.

During operation, an index $I_1$ identifies a first predefined matrix used for precoding a transmit signal in a first communications device. The index $I_1$ has been determined in a second communications device receiving the signal transmitted by the first communications device and has been transmitted to the first communications device such that both participating communications devices have knowledge of the first index $I_1$.

After a channel change has been detected, the second communications device may perform a search in the codebook 720 for identifying the index I of that predefined matrix that fits best with the second unitary matrix obtained by SVD of the new equivalent channel matrix $H_2V_1$.

After the index I has been identified, the second communications device addresses the code book entry $c_{1,11}$ which is the index $I_2$ of that predefined matrix that fits best with the product matrix $V_1 V$. The second communication device may transmit the index $I_2$ or any other value from which the index $I_2$ is unambiguously derivable to the first communication device.

The decode matrix in the second communication device may be handled in an equivalent way.

As long as the second communications device does not detect a channel change, the precode matrix may is kept unchanged. In accordance with a further embodiment, during a learning phase a codebook search identifies the predefined precode matrix fitting best with the calculated ideal precode matrix, e.g. the second unitary matrix obtained by SVD of the channel matrix $H_1$, and determines a first distance metric defining the distance between the calculated ideal precode matrix and the best fitting predefined matrix for $H_1$. After the learning phase, the second communications device may continuously perform a codebook search for identifying the index I of that predefined matrix that fits best with the calculated ideal precode matrix, e.g. the second unitary matrix obtained by SVD of the channel matrix $H_1V_1$ and determines a second distance metric defining the distance between the calculated ideal precode matrix and the best fitting predefined matrix for $H_1V_1$.

If the second distance metric is smaller than the first distance metric, then the equivalent channel can be better approximated than the actual channel $H_1$. As a result precoding/decoding may deliver better results. The second communications device may therefore transmit a command to the first communications device to use that matrix which is defined by $V_1V$ instead of that matrix fitting best with $V_1$.

Figure 8:
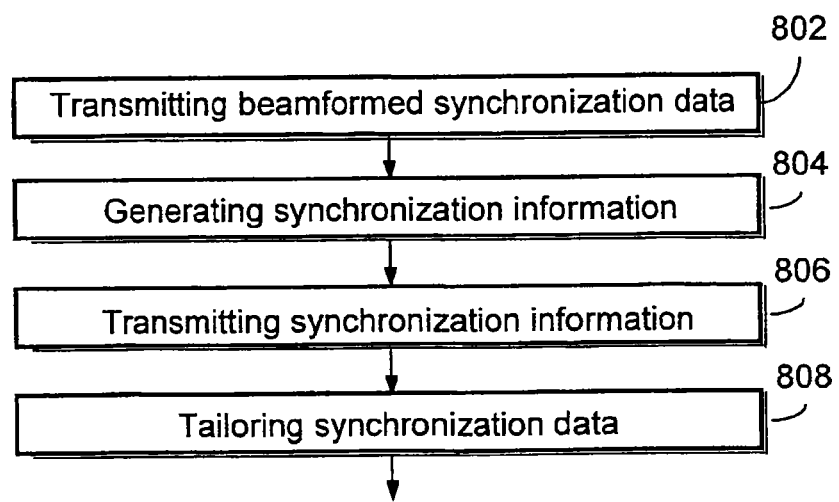
FIG. 8 is a simplified flow chart illustrating the method for operating a communications system in accordance with further embodiments.

FIG. 8 refers to a method of operating a communications system comprising at least a first and a second communication device connected via a transmission channel. Transmit signals containing beam formed payload data and beam formed synchronization data are transmitted from the first communications device to the second communications device via the transmission channel (802). In the second communication device a feedback information describing a minimum synchronization data required for undisturbed reception is generated on the basis of the beam formed payload data and the beamformed synchronization data (804). The feedback information is transmitted to the first communication device (806), which tailors the synchronization data on the basis of the feedback information (808).

According to an embodiment, a communications system comprises a first communications device that comprises: A transmitter unit configured to transmit at least two parallel transmit signals via a transmission channel, wherein each transmit signal contains synchronization data and a precode unit configured to beam form the transmit signals in accordance with a channel state information and a second communications device that comprises: a receiver unit configured to receive and decode at least one of the transmit signals via the transmission channel. The transmitter and receiver units can be any of the one described above.

According to another embodiment, a method of operating a communications system comprising at least a first and a second communication device includes transmitting transmit signals containing beamformed synchronization data from the first communications device to the second communications device via a transmission channel. The method can be performed using any of the transmitter and receiver units described above.

The invention claimed is:
1. A communications device comprising:
circuitry configured to act as:
a transmitter unit configured to transmit at least two parallel transmit signals via a transmission channel of a communications system; and
a precode unit configured to generate transmit signals based on beamforming and to ensure that the transmit signals do not exceed a predetermined signal level at a predefined geographic location in the communications system.

2. The communications device of claim 1, wherein the precode unit is further configured to select frequencies of the transmit signals and ensure that the selected frequencies do not exceed the predetermined signal level at the predefined geographic location.

3. The communications device of claim 1, wherein the predefined geographic location is a location in the air at which the electrical or magnetic field of signal radiation does not exceed the predetermined signal level.

4. The communications device of claim 1, wherein
the transmit signals contain at least one of payload data, synchronisation data, and training symbols.

5. The communications device of claim 1, wherein
the precode unit is further configured to beamform the transmit signals.

6. The communications device of claim 1, wherein
a power line communications system provides the transmission channel.

7. The communications device of claim 6, wherein the predefined geographic location is a location connected to a power line grid at which at least one of the transmit signals does not exceed the predetermined signal level.

8. The communications device of claim 1,
wherein the circuitry is further configured to act as:
a precoder control unit configured to control the precode unit in response to a first channel state information, by determining a
precode matrix used for transmission via a first transmission channel on the basis of the first channel state information and a second channel state information describing a second transmission channel to another communications device such that signal power at the another device is minimized.

9. A communications device comprising:
circuitry configured to act as:
a receiver unit configured to receive at least one receive signal via a transmission channel, wherein the at least one receive signal has been beam formed before transmission on the basis of channel state information describing the transmission channel; and
a qualification unit configured to generate feedback information including an elimination identifier specifying that transmit signals, from the communication device should be below a predetermined level at least for predefined frequency ranges; and
an output unit configured to output the feedback information.

10. The communications device of claim 9, wherein the elimination identifier contains information identifying the predefined frequency ranges for which the transmit signals should be below the predetermined level.

11. The communications device of claim 9, wherein the qualification unit is further configured to set the elimination identifier by user interaction.

12. The communications device of claim 9, wherein
a power line communications system provides the transmission channel.

13. A method for operating a communications system comprising:
transmitting at least two parallel transmit signals via a transmission channel of the communications system; and
generating the transmit signals based on beamforming such that the transmit signals do not exceed a predetermined level at predefined geographic locations of the communications system.

14. The method according to claim 13, wherein a power line communications system provides the transmission channel.

* * * * *